(12) United States Patent
Worrall et al.

(10) Patent No.: US 8,541,683 B2
(45) Date of Patent: Sep. 24, 2013

(54) CABLE TERMINATION SYSTEM

(75) Inventors: Peter William Worrall, Mordon (GB); Phillip Allan Ward, Ely (GB)

(73) Assignee: JDR Cable Systems, Ltd., Hartlepool (GB)

( * ) Notice: Subject to any disclaimer, the term of this patent is extended or adjusted under 35 U.S.C. 154(b) by 370 days.

(21) Appl. No.: 12/799,940

(22) Filed: May 4, 2010

(65) Prior Publication Data

US 2010/0314151 A1    Dec. 16, 2010

(30) Foreign Application Priority Data

Jun. 15, 2009  (GB) .................................... 0910249.2

(51) Int. Cl.
*H02G 15/08* (2006.01)
(52) U.S. Cl.
USPC ............................................................ 174/82
(58) Field of Classification Search
USPC ......................................... 174/70 S, 82, 84 C
See application file for complete search history.

(56) References Cited

U.S. PATENT DOCUMENTS 2,697,739 A     12/1954  Presswell
6,010,369 A  *   1/2000  Itabashi et al. ................ 439/660

FOREIGN PATENT DOCUMENTS

GB          175826       3/1922
GB          742331      12/1955

* cited by examiner

*Primary Examiner* — Chau Nguyen
(74) *Attorney, Agent, or Firm* — Lynn & Lynn; John H Lynn

(57) ABSTRACT

An armoured cable termination system and method of assembly is provided that clamps the armour wires of the cable over and around the back of a conical inner armour clamp member. The wires are also retained between the inner clamp member and an outer body and a securing end plate. The armour wires are splayed by the inner clamp member, which is forced onto the cable to displace the armour wires. The forcing mechanism is used to support an armour wire former that bends the armour wires around the back of the inner clamp member. The top clamp is then forced onto the termination assembly, such that the armour wires adopt a smooth curve around the back of the inner clamp and are securely clamped along their length. The assembly may then be mounted to a flexible pulling head for pulling it into contact with a structure.

16 Claims, 6 Drawing Sheets

CABLE TERMINATION SYSTEM

TECHNICAL FIELD

This invention relates to undersea cable termination systems.

BACKGROUND

Modern sub-sea cables are often laid in hazardous environments, and can be subject to high force loadings. In order to ruggedize the cables so that they are capable of withstanding these forces, they usually comprise a woven outer armour layer of thick steel cables, wires or similar. This sturdy armoured layer preferably takes the strain when the cable is stretched or bent, protecting the inner components of the cable.

The part of a cable close to its termination, for example, at the cable's final destination, is often subject to a particularly high strain as the flexible, moveable cable is connected to a stationary, rigid object. As such, it is preferable that the armour wires of the cable are very securely coupled to the structure the cable is connected to, so as to avoid undue strain on the inner components. It may further be preferable to limit the motion of the cable close to the termination, for example by using a bend-restricting sheath of some sort.

An example of a cable termination structure is illustrated in FIG. 1. Armoured undersea cable 2 is shown having an outer sheath 13, armour wires 10 and inner component 12. The cable 2 passes through terminating plates 4 and 6; the terminating rings being held together with bolts 8. The armour wires 10 of cable 2 are splayed out between terminating plates 4 and 6, allowing the inner component 12 of the cable to continue to its destination. This cable termination structure, although relatively easy to make, requires significant preparation of the cable at the point of installation. Furthermore, the armour wires are exposed to significant strain as they are forced around a tight right-angled bend, this strain being concentrated in the bend.

For long cables, the time consuming process of preparing the cable for termination is not a particularly great concern, as the effort required is relatively small compared to that of laying the cable. However, with the advent of offshore wind farms there is now a demand for greater numbers of shorter cables. The comparatively shorter cables mean that the cable termination becomes a much more significant element in the installation process. Therefore an undersea cable termination system that does not require as much on-site preparation of the cable to be terminated and reduces the time required to effect the termination of a cable is desired.

SUMMARY OF THE INVENTION

According to a first aspect of the invention there is provided a terminated cable comprising an armoured cable having an inner component and an armour layer arranged around the inner component; and a termination assembly, the termination assembly comprising a first clamping member comprising an inner channel having at least a portion tapering to a larger diameter at one end, the cable passing through the inner channel; a second clamping member having a tapered outer portion lying at least partially within the inner channel of the first clamping member, the tapered portion extending to a generally curved portion on one end of the second clamping member, the armour layer being splayed away from the inner component along the tapered portion and continuing around the curved portion to bend back on itself, the armour layer being retained between the first clamping member and the second clamping member; and an end cap comprising a recessed curved portion which engages the armour layer where it passes around the curved portion of the second clamping member, to clamp the armour layer between the curved portion of the second clamping member and the recessed curved portion of the end cap.

Preferably, the curved portion of the second clamping member has a shape resembling a torus cut in half in its radial plane. This provides a smooth even surface with which to clamp.

Preferably, the tapered portion of the second clamping member is generally frusto-conical in shape. This simple outside surface facilitates mounting the second clamping member into the termination assembly.

Optionally, the generally frusto-conical portion of the second clamping member has a convex surface. This may provide different clamping characteristics for use in different environments.

Optionally, at least one portion of the first clamping member, second clamping member and end cap has grooves thereon for engaging the armour layer. This may help more firmly clamp the armour layer.

Preferably, the first clamping member, second clamping member and third clamping member are made from materials with similar thermal expansion coefficients. Having similar thermal expansion coefficients reduces the adverse effects a change in temperature might have on the termination assembly.

According to a second aspect of the invention there is provided a kit of parts for making a termination assembly for an armoured cable having an inner component with an armour layer around it, the termination assembly comprising a first clamping member for fitting around the cable, the first clamping member defining a channel through which the cable may pass, at least part of said channel being tapered; a second clamping member comprising a channel for receiving the inner component of the cable, a tapered outer section for fitting within at least part of the tapered portion of the channel in the first clamping member to engage the splayed armour layer of a cable there between, the end face of the second clamping member having a generally curved portion on one end; and an end cap comprising a recessed annular curved section, and a hole through which the inner component of a cable may pass, the end cap being adapted for clamping the armour layer between the curved portion of the second clamping member and the recessed annular curved section of the end cap.

Preferably, the curved portion of the second clamping member has a shape resembling a torus cut in half in its radial plane.

Preferably, the tapered outer portion of the second clamping member has a generally frusto-conical shape.

Optionally, the generally frusto-conical portion of the second clamping member has a convex surface.

Optionally, at least one portion of the first clamping member, second clamping member and end cap has grooves thereon for engaging the armour layer.

Preferably, the first clamping member, second clamping member and third clamping member are made from materials with generally similar thermal expansion coefficients.

According to a third aspect of the invention there is provided a method for terminating an armoured cable comprising an inner component with an armour layer around it, the method comprising placing a first clamping member having a tapered inner channel around the cable at a point where the cable is to be terminated; splaying the armour layer so that a section of the armour layer lies along the walls of the tapered channel of the first clamping member; placing a second clamping member having a tapered outer portion, around the inner component of the cable and pushing the second clamping member toward the first clamping member such that the armour layer is retained between the tapered inner channel of the first clamping member and the tapered outer portion of the second clamping member; bending the armour layer around a curved end face of the second clamping member; and engaging an end cap with the second clamping member for clamping the armour layer between the end cap and second clamping member.

Preferably, the armour layer is splayed by pushing the second clamping member along the inner component of the cable towards the first clamping member. This helps ensure that the second clamping member will fit snugly in the terminated armoured cable.

Preferably, the engaging of the end cap with the second clamping member is carried out by attaching the end cap to the first clamping member. The second clamping member is consequently secured within the first clamping member by the end cap.

According to a fourth aspect of the invention, there is provided a tool for terminating an armoured cable, the cable comprising an inner component with an armour layer around it, the tool comprising a bearing member for fitting around the inner component of the armoured cable and having a generally circular hollow recess provided in an end face; and an armour forming member comprising a pivot head, a forming head and a lever member; wherein the pivot head is adapted to be inserted into the recess such that the lever member can be used to pivot the armour forming member around the pivot head to thereby move the forming head in a generally radial direction to engage the armour layer to cause it to deflect radially inwards and wherein the pivot head may be slid circumferentially within the recess.

Preferably, the body is also provided with a driving face for pushing termination components along the axis of the cable. This means that the tool can be used in multiple stages of cable termination.

Preferably, the forming head has grooves thereon for engaging individual strands of the armour layer of the cable. This helps prevent the strands from slipping when being formed.

According to a fifth aspect of the invention, there is provided a pulling head for attaching to a terminated cable comprising a cable having a termination assembly on one end, the pulling head comprising an elongated flexible body portion for receiving inner components of the cable which extend beyond the termination assembly; a termination assembly coupling member provided on one end of the body portion adapted to be coupled to the termination assembly; and a pulling cap provided on the opposite end of the body portion to the termination assembly coupling member, to allow pulling of the pulling head.

Preferably, the pulling cap, body portion and coupling member form a watertight compartment around the inner components of the cable. This keeps the inner components dry and prevents corrosion or short circuits forming.

Preferably, the flexible body portion comprises a braid for transferring a pulling force between the ends of the pulling head and which is enclosed by a water-resistant layer. This allows the flexible portion to remain flexible and water-resistant whilst still being able to transfer a pulling force.

Preferably, the flexible body portion further comprises radial strain members for resisting reduction in diameter of the elongated flexible body portion caused by axial loading.

The pulling head of the fifth aspect is preferably used for pulling terminated cables of the present invention.

BRIEF DESCRIPTION OF THE DRAWINGS

A specific embodiment of the invention will now be described, by way of example, with reference to the drawings in which.

DETAILED DESCRIPTION

The embodiment described below relates to an undersea cable termination system and associated tools and methods. However, the principles described may be adapted for use in other cable termination systems.

Figure 2:
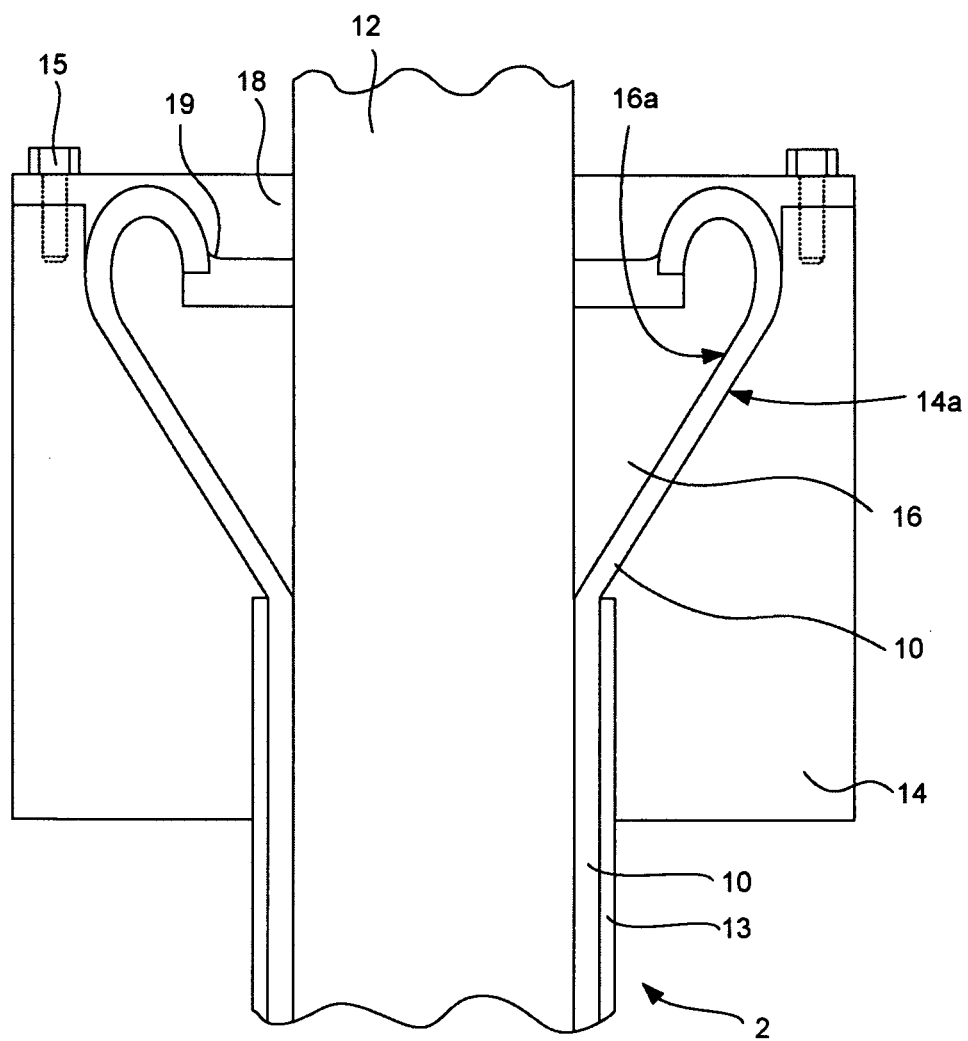
FIG. 2 is a schematic cross section of a cable terminated using an embodiment of the invention.

FIG. 2 shows an armoured cable mounted in the termination system of an embodiment of the invention. Armoured undersea cable 2 has inner components 12, outer sheath 13 and armour wires 10, as before. In this termination system, rather than splaying the armour wires 10 out at 90 degrees they are instead held between an armour body member 14 and tapered inner armour clamp member 16 at an acute angle to the axis of the cable 2. The armour wires 10 are then wrapped around the back of inner armour clamp member 16 and secured by end cap 18. The inner clamp member 16 and the armour body member 14 have complementary tapered surfaces 16a and 14a respectively, for securing the armour wires. These surfaces preferably resemble the surfaces of a cone (although other tapers may be combined to form a compound taper with different angles, or an overall curved taper). These surfaces, and the others used to engage the armour wires, may be grooved parallel to the direction in which the wires lay in order to better retain them and to engage with a larger surface area of the cable. Alternatively, the surfaces may have grooves perpendicular to the wires in order to better grip the wires by digging into them.

Inner clamp member 16 has a frusto-conical outer profile, with a channel through the middle for receiving the inner components 12 of the cable 2. The wider end of the frusto-conical profile blends into a curved portion, which curves back on itself towards the inner channel of inner clamp member 16. End cap 18 and inner clamp member 16 have complementary portions for engaging opposite sides of the curved portion of the armour wires 10. Bolts 15 hold the assembly together, securing end cap 18 against armour body member 14. End cap 18, by virtue of this securing force, pushes on inner clamp member 16 therefore clamping the armour wires 10 between the surfaces 14a and 16a of armour body member 14 and inner clamp member 16. This secures the armour wires in the termination system, and therefore firmly anchors the cable to the cable termination system. Furthermore, the wires are clamped between end cap 18 and inner clamp member 16 in the curved region of the components, again securing the armour wires within the termination system.

In use, the cable may well be subject to high strain, as the termination system assembly will be mounted to a fixed object and the cable able to move around. As such, the clamping arrangement of armour body member 14, inner clamp member 16 and end cap 18 are designed so as to maximise the total frictional force exerted on armour wire 10, preferably such that the force approaches the tensile strength of the armour wires themselves. A frictional force similar to the tensile strength of the armour wires means that the termination system does not become a weak link in the cable system. In other words the termination is effectively as strong as the cable itself. In practice, it may be preferable to have a frictional force as slightly less than the tensile strength of the armour wires, so in the event of an extreme loading failure it is the end of a cable that fails, rather than the middle.

In undersea applications, cables can be exposed to substantial loads and so the armour wires 10 are normally of substantial thickness to give them the necessary strength and stiffness. The high frictional force exerted on the armour wires 10 is achieved by a combination of being clamped between the armour body member 14 and inner clamp member 16 along the straight part of the cable, and being clamped between the end cap 18 and inner clamp member 16.

The angles and lengths of the various components of the termination assembly are selected in order to maximise the frictional force on armour wire 10. As an illustrative example, a termination system for a cable having an inner component diameter of 50-100 mm, preferably 65-85 mm and more preferably 75 mm and an armour wire diameter of 2-10 mm, preferably 3-8 mm and more preferably 5 mm may have the following dimensions (the dimensions listed here are approximate to within +/−2 mm or degrees as appropriate): The inner clamp has an overall length of 50-200 mm, preferably 75-175 mm and more preferably 135 mm and the tapered surface of the inner clamp is at 2-30°, preferably 5-20° and more preferably 10° to the axis of the clamp. The curved portion at the back of the inner clamp has a smooth, circular curvature of radius 4-20 mm, preferably 6-15 mm and more preferably 8 mm. The channel in the armour body member has a taper complementary to the inner clamp, and a diameter at its narrowest point of 50-200 mm, preferably 75-150 mm and more preferably 100 mm, corresponding with the narrowest diameter of the inner clamp member being 45-180 mm, preferably 70-130 mm and more preferably 90 mm (excluding chamfers). The end cap has a curved portion for securing the wires against the inner clamp member in the region of the clamp member where the wires had begun to curve back on themselves. This curved portion has a concave, circular curvature of radius 6-30 mm, preferably 8-25 mm and more preferably 13 mm to firmly grip the armour wires.

In a simple friction clamp, the maximum force that can be resisted (hence its maximum frictional force) can be obtained from the equation:

$$F = \mu * R$$

Where F is the force, $\mu$ is the coefficient of friction and R is the Reactive Clamping Force. For example, if the coefficient of friction is 0.1 then to resist a force of 10 kN then there needs to be a reactive clamping force, applied normally to the direction of F, of 100 kN. As there is a maximum pressure that can be applied to the wire before it simply squashes, the size of the overall clamping area can be increased to increase the maximum frictional force.

Figure 1:
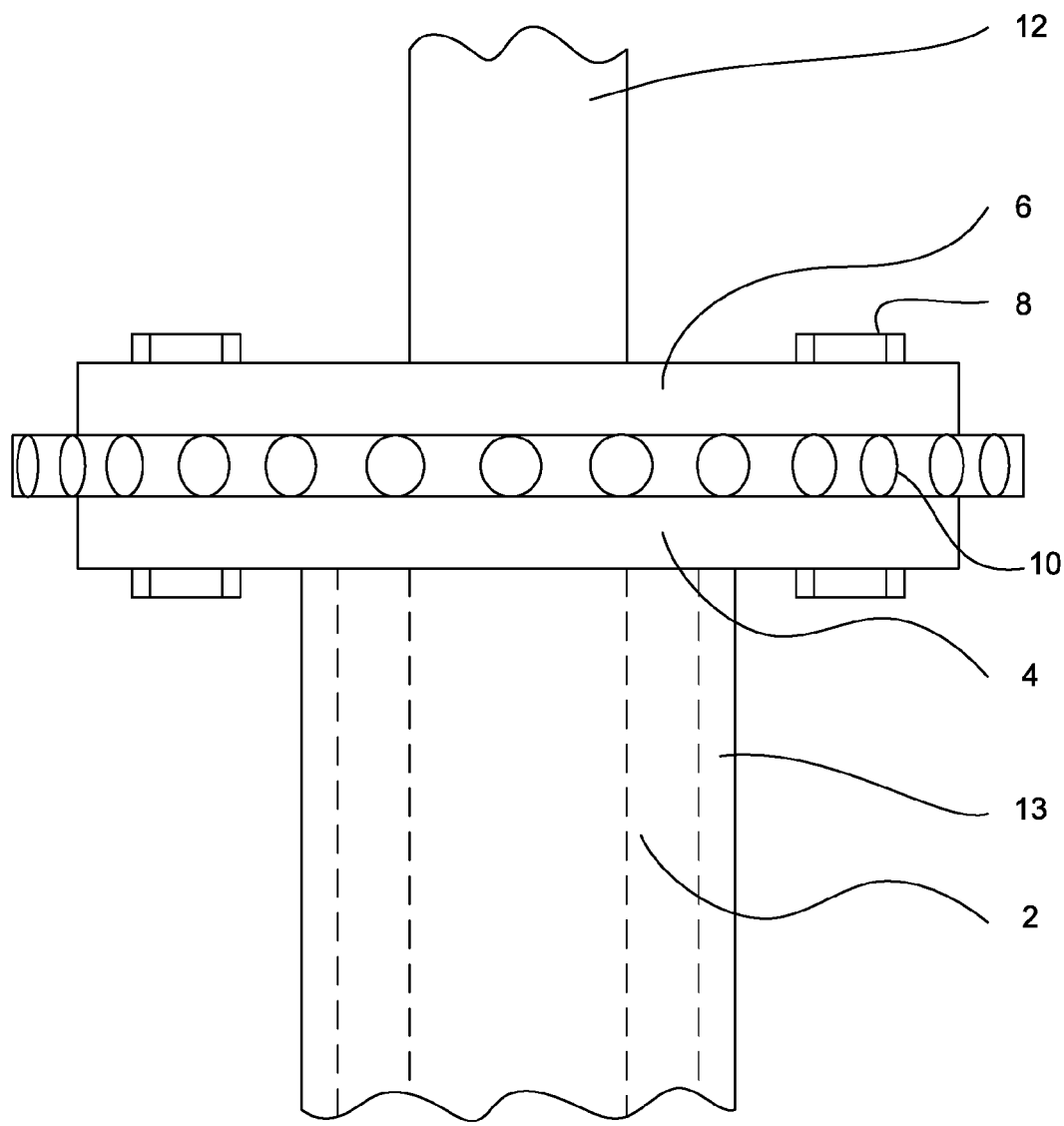
FIG. 1 is a schematic side view of a cable terminating system.

In this embodiment, the armour wires 10 are wrapped around the back of inner clamp member 16. When compared with a straight clamp, for example as illustrated in FIG. 1, this increases the size of the overall clamping area without unduly increasing the size of the termination assembly. Furthermore, as the armour wires are curved, they must be straightened if the armour wire is to be pulled out of the termination assembly. This means that the stiffness of the armour wires (their resistance to bending) contributes to the overall resistive force applied to the armour wire 10. In many typical straight clamps, some movement of the clamping members or armour wires occurs when the assembly is put under load in order to "activate" the locking of the clamping members. Curving the armour wires behind the inner clamping member and securing them there "preloads" the termination assembly, reducing or even eliminating any movement in the assembly when it is first put under load.

The components of the termination assembly are preferably fabricated from materials that are not only corrosion resistant, but also that have appropriate expansion coefficients such that the expected temperature range in which the assembly is to be used will not compromise the strength of the clamping of the cable, and further preferably such that any expansions are contained within linear, reversible elastic regions of the materials used. For example, ferritic metals are generally appropriate, provided that the structures are chosen so that their expansion coefficients are within 20% of each other in the range of −20 to +40° C.

Figure 3:
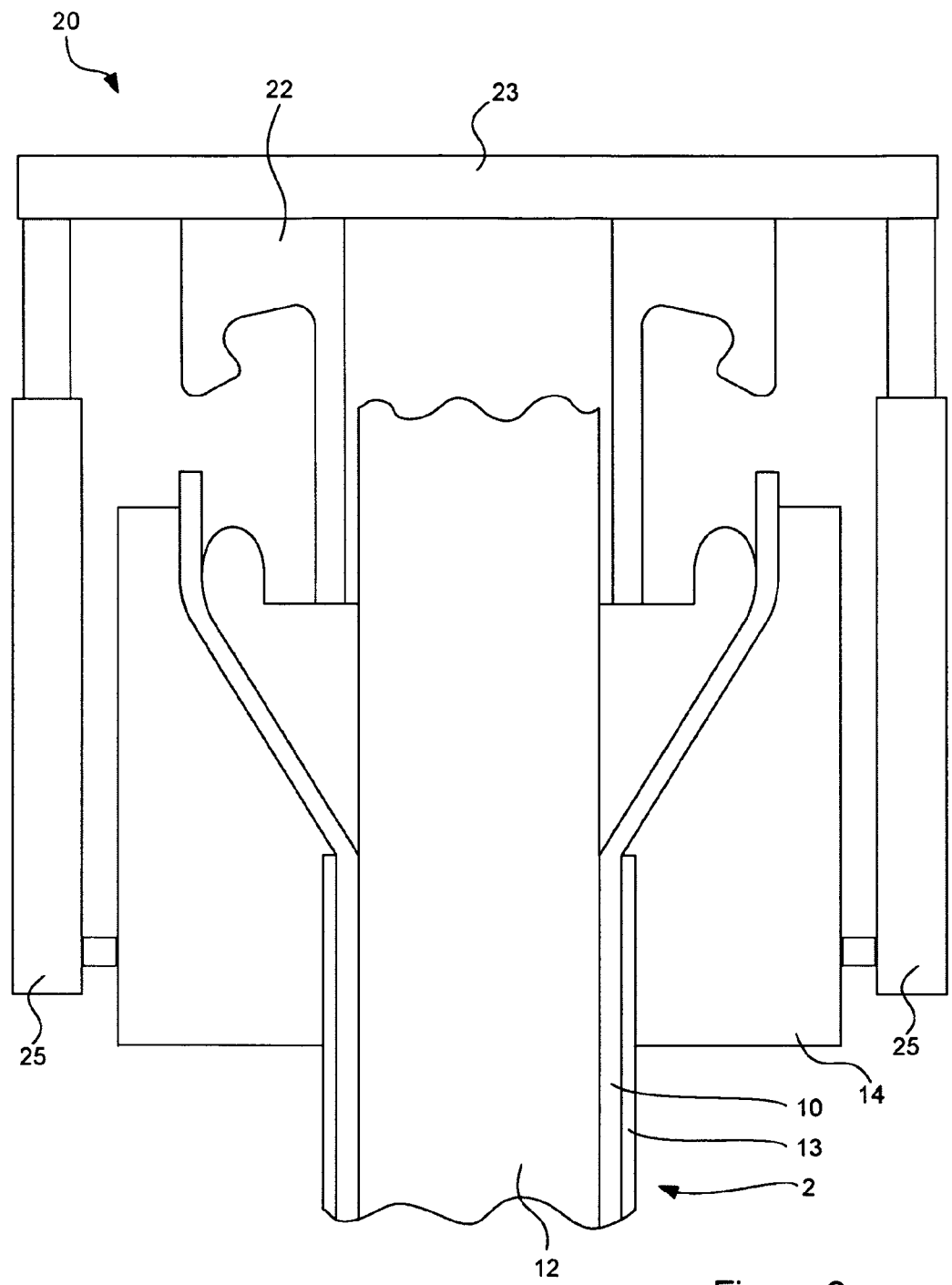
FIG. 3 is a schematic cross section of an assembly jig being used to terminate a cable according to an embodiment of the invention.

As the armour wires 10 of the cable 2 are thick and stiff, they are difficult to manually manipulate and bend into the shape required in FIG. 2. FIG. 3 shows an assembly jig 20, in place on the cable, for wrapping the armour wires around the rear of inner clamp member 16. In order to assemble the cable termination structure of FIG. 2, the cable 2 is cut, and the armour wires 10 typically cut shorter to leave inner components 12 of the cable protruding. The cable may be cut using a pipe cutter or similar rotary cutter. Inner clamp member 16 is slid down the cable, around the inner components 12. It is then forced into the region between the inner components and the armour wires 10 in order to splay the armour wires 10 radially away from the cable.

In FIG. 3, inner clamp member 16 is shown in its final position, and has been forced down by tool body 22. Tool body 22 is pushed down on inner clamp member 16 by hydraulic rams 25, which couple tool body 22 to the armour body member 14 via a pusher plate 23.

Figure 4:
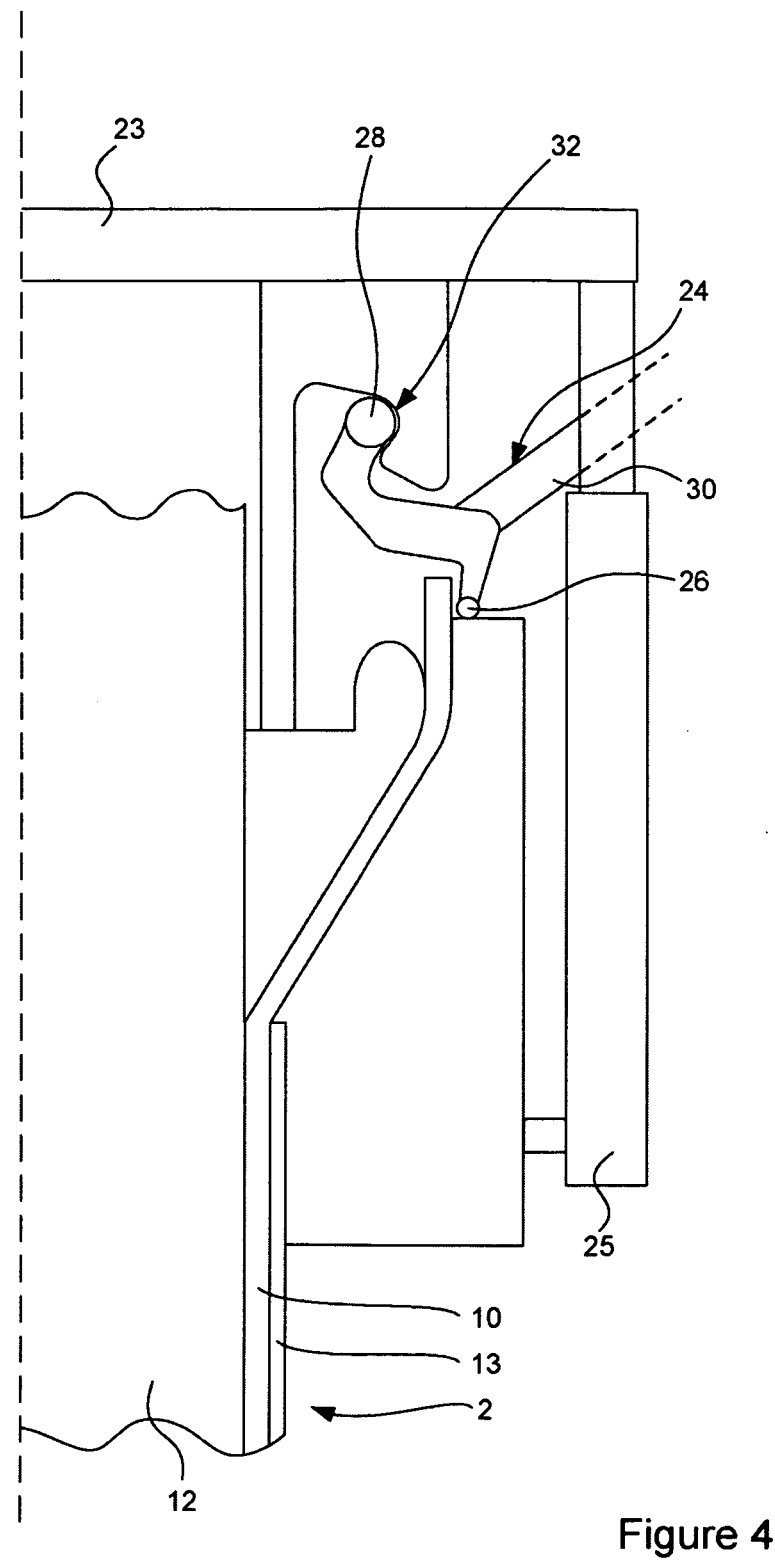
FIG. 4 is a schematic cross section of an armour forming tool being mounted in an assembly jig according to an embodiment of the invention.

The assembly jig 20 is then used to form the armour wires 10 over the rear of inner clamp member 16 using a rolling action. As shown in FIG. 4, the assembly jig 20 comprises one or more armour forming tools 24, the forming tools have a handle 30, a forming head 26 and a pivot 28.

The tool body 22 includes an internally undercut recessed circular channel 32 into which the pivot 28 is inserted. The pivot 28 is inserted into the circular channel 32 around the assembly tool 20, to engage the undercut portion. In this way, the entire forming tool 24 can be position at any position around the outer periphery of the cable 2. The forming tool 24 can also be rotated around pivot 28 to cause the forming head 26 to move radially towards the cable to engage and deflect the armour wires 10.

In order to form the wires, the handle 30 of the armour forming tool 24 is rotated, causing the forming tool 24 to rotate around pivot 28 and the head 26 to engage one or more of the protruding armour wires 10 and bend them inwards. In order to prevent the wires slipping sideways, forming head 26 may have grooves provided on its surface to retain the wires as they are bent. The long handle 30 provides leverage for manually bending the stiff wires, and after one group of wires is bent it is very easy to simply lift the handle and move the forming tool around the circumference of the channel 32 to form the next group of wires. In the case of 4 mm armour wires, common in undersea cables, they may be typically formed in groups of 5 to 20 wires depending on the size of the head 26. Of course the number of wires will depend on the thickness of the wires, the diameter of the cable and other factors.

Figure 5:
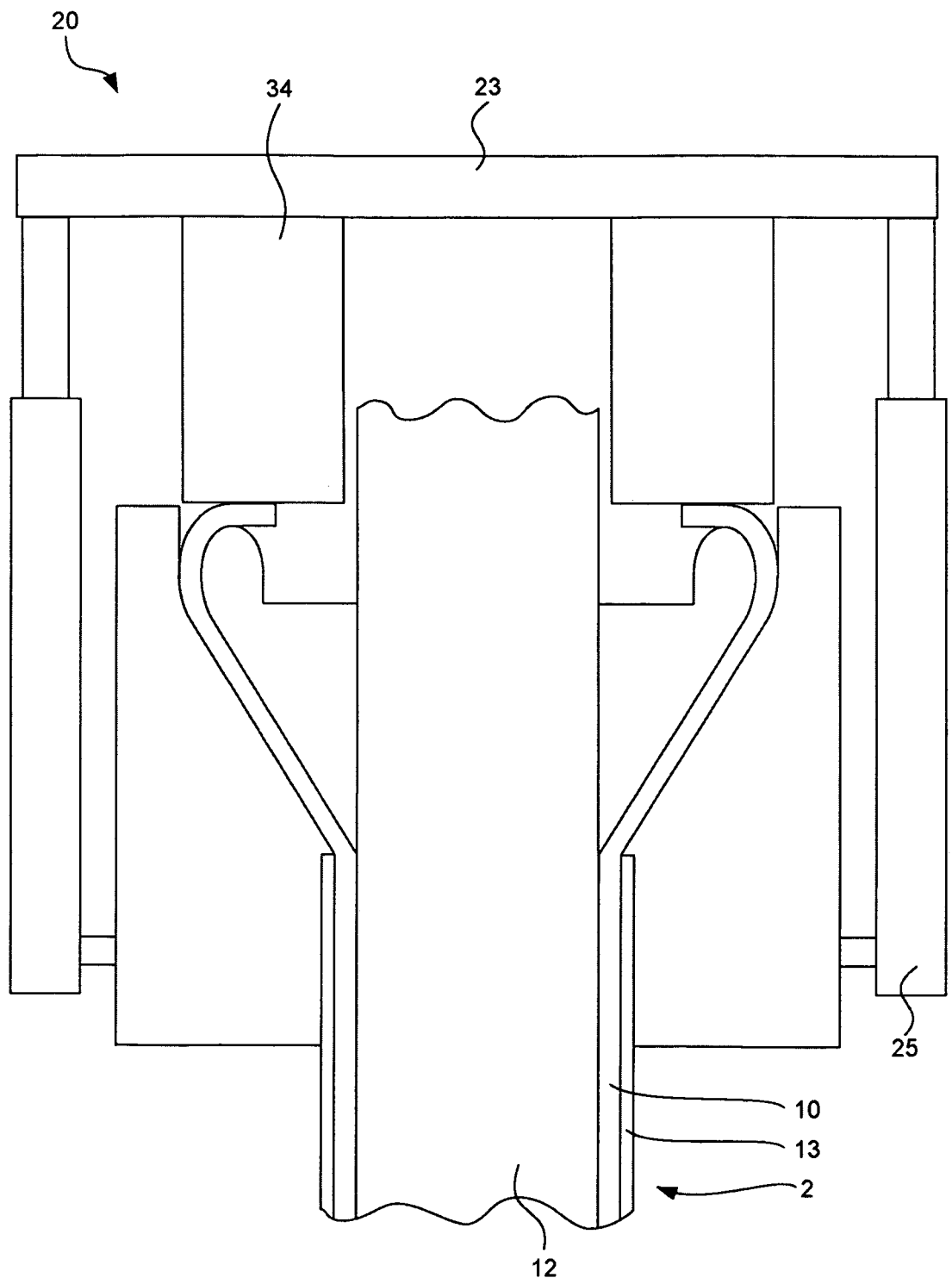
FIG. 5 is a schematic cross section of a flat former tool being used to flatten the armour wires of a cable according to an embodiment of the invention.

After the forming tool 24 has been used to bend all the armour wires 10, the wires will typically be bent through roughly a right angle. In order to complete the bending of the armour wires for following the contour of the curved end surface of inner clamp member 16, they must be further processed. Initially, as shown in FIG. 5, a flat former tool 34 may be used to ensure that all the wires are uniformly bent through a right angle. The flat former tool 30 is a hollow cylinder with flat end faces. This is forced against the armour wires 10 to flatten them against the inner clamp member 16. As with the tool body 22, the flat former tool is pushed down by the hydraulic rams 25 via the pusher plate 23. This process ensures that the wires are uniformly flat. The flat former tool 30 is then removed ready for the final forming stage, using the end cap 18. The flat former stage may be omitted if the wires can be reliably and uniformly bent during the previous stage. Alternatively, the flat former stage may be omitted and the end cap may act as a flat former when it is pushed onto the termination assembly.

End cap 18 completes the forming of armour wires 10 around inner clamp member 16 as it is engaged with the armour body member 14. To achieve this end, the curved portion of its surface is suitably shaped with a lead-in chamfer 19. The end cap 18 may be pushed onto the termination assembly using the pusher plate 23 and hydraulic ram 25. Alternatively, a separate tool may be forced down onto the cable using the hydraulic ram 25 to finish forming the wires around the back of inner clamp member 16. Similarly, the skilled man will realise that in the case where it is desirable to avoid excess strain on inner clamp member 16, a separate splitting tool may be forced down the wire to initially splay the armour cables 10 before inserting inner clamp member 16.

Armour body member 14 may be mounted on the cable before the introduction of inner clamp member 16 as shown in the figures, or may alternatively comprise several parts which can be put together on the cable at another stage of the assembly process. Optionally, the inner clamp member 16 and end cap 18 are made in two or more sections. This may, for example, reduce costs by making manufacturing easier. The sections may be attached to each other before being mounted into the termination assembly, or alternatively may be mounted as separate components one at a time. Obviously, these components could be divided into any reasonable number of sub components for manufacturing or assembly purposes.

The surface of the end cap 18 may be grooved in a similar manner to the armour body member 14 and inner clamp member 16 to better engage the armour cables. The grooves may be parallel to the armour wires to provide a seat for the armour wires to sit in or, alternatively, angled relative to the wires so that the edges of the groove bite into the cables to actively engage them rather than relying solely on friction. The complementary face of the inner clamp member 16 may have corresponding grooves.

In summary, the cable 2 is cut at the place where it is to be terminated, and armour body member 14 is placed around the cable at that point. Inner clamp member 16 is placed on the cable and forced into the termination location by assembly jig 20, which is coupled to armour body member 14 by hydraulic rams 25, the rams providing the force for pushing inner clamp member 16. This splays the armour wires 10, which are then bent around the back of inner clamp member 16 by armour forming tool 24. The hydraulic rams 25 are then used again to force the flat former tool 34 onto the wires to distribute them and bend them accurately. Finally the ram is used to force end cap 18 onto the end of the assembly, bending the wires back around the inside of inner clamp member 16 to finish the structure.

Assembly jig 20, including hydraulic rams 25 and armour forming member 24, may then be removed. The skilled man will realise that modifications may be made to the described process or apparatus in order to achieve the same goal, some of which are described above. For example, the end cap 18 may be secured to the armour body member 14 by various means, such as bolts, screws, clips or welding. Furthermore, tool body 22 may be pushed down onto the terminating assembly by other means such as worm gear threaded shafts turned by a motor rather than hydraulic rams. The assembly jig 20 may be biased with a spring or resilient means to speed the separation of the jig after it is used for driving in a component.

The curved portion of the inner clamp member 16 may be shaped to resemble half a torus or even slightly more then a half torus, for better blending with the frusto-conical portion. However, the specific shape is not critical as long as it allows the armour cables to be bent around the end of the inner clamp member 16 so as to engage the end of the thereof. In fact, the curved portion may be an approximation to a curved surface, comprising straight and/or angled parts.

Hydraulic ram 25 is described above as being coupled to the armour body member 14. This may be in the form of a semi-permanent connection such as a bolt. Alternatively, as the forces acting on the hydraulic rams are almost entirely parallel to the axis of the cable, the rams may be coupled to the armour body member 14 by engaging with a slot. For example, the hydraulic rams may be coupled together by an attachment member, which slots into an appropriate groove on the armour body member 14, perpendicular to the axis of the cable. This groove allows the hydraulic rams to exert a force on the armour body member 14 parallel to the axis of the cable, whilst allowing the assembly jig 20 to be quickly mounted onto and removed from armour body member 14.

The pusher plate 23 may have an opening in it to allow the passage of the inner components 12 of cable 2 without the inner components having to be bent. This opening may be in the form of a circular hole in pusher plate 23, or alternatively there may be a recess in pusher plate 23 to avoid excessive bending of the inner component 12 whilst making the pusher plate easy to mount onto and remove from the cable.

An undersea cable is normally coupled to an off-shore platform or device by passing it through a "J-tube". A J-tube typically runs from the top of the platform (or the place where the terminated cable is docked or otherwise coupled with the platform) to the sea floor, typically terminating in a bend where the cable enters the platform (hence the term "J-tube"). Typically, a terminated cable will be coupled with a platform by pulling it through the J-tube from the top after introducing the "head" of the cable at the bottom of the tube. J-tubes are often relatively narrow tubes, and may be have various curves and bends within them. They therefore impose a limit on the size of any termination assembly that may be passed through them. Consequently, the small size of the termination assembly obtained using the described embodiment is advantageous as it will fit through smaller J-tubes than alternative termination assemblies, or at least move more easily through similar J-tubes.

Figure 6:
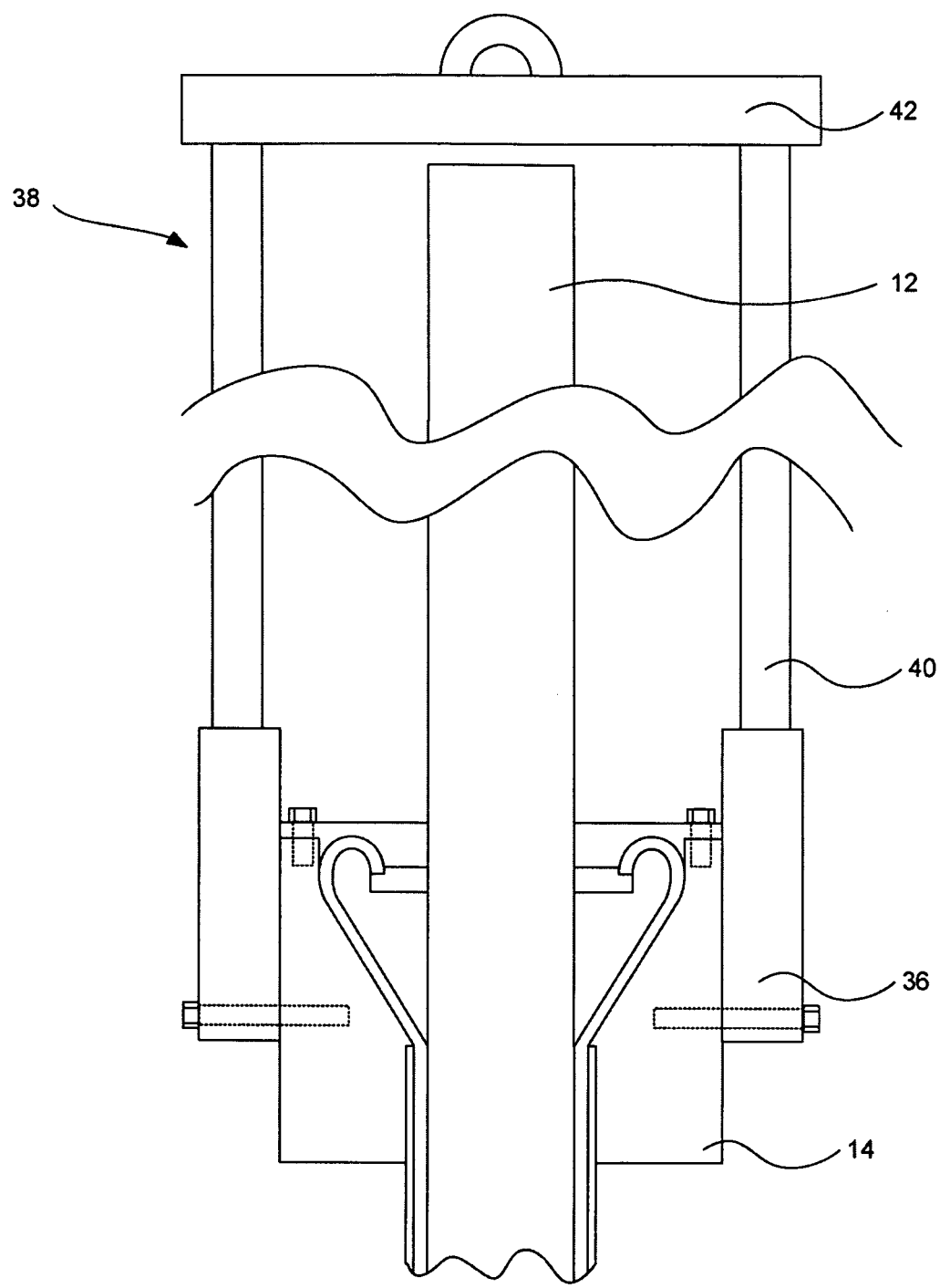
FIG. 6 is a schematic cross section of a pulling head attached to a cable terminated according to an embodiment of the invention.

Typically, a cable terminating assembly will be fabricated to cooperate with a "pulling head", a component to which e.g. a high tensile wire can be connected to facilitate installation of the cable. This pulling head is preferably sealed to the cable termination structure to prevent the ingress of water. FIG. 6 shows such a pulling head 38, in which armour body member 14 is adapted to be mounted to the connector 36 of pulling head 38. Pulling head 38 further comprises a flexible section 40 and pulling cap 42. The pulling head assembly 38 is waterproof, and can contain the inner components 12 of the cable 2. This allows the entire terminating assembly and pulling head to be pre-assembled, e.g. on shore, simplifying the installation process of the cable at sea. The flexible section 40 is preferably waterproof, sufficiently long (typically 5 metres) and sufficiently flexible to facilitate its insertion through a convoluted J-tube and coupling to a structure.

The use of flexible section 40 facilitates the insertion of the pulling head into the J-tube as it can easily curve round bends in the J-tube. In combination with the small termination assembly offered by the above embodiment and a small pulling cap the pulling head renders installation of a terminated cable easier and quicker, as the "unbending" sections of the pulling head and termination assemblies are reduced in size. Flexible section 40 is made from a plastic (preferably linear low/density polyethylene) encased metallic braid (preferably steel wire) and transfers the tension applied to the pulling head from cap 42 to connector 36. The braid preferably comprises counter helical laid wires, which eliminate torsion problems. However, such a braid will tend to reduce its radial dimension in response to applied stress. To counteract this, the braid may be formed over a roll-formed thin helical steel anti-compression member of appropriate form and helical pitch to withstand such radial stress. The appropriate form and pitch will depend on the stiffness and pitch of the braid as well as the forces that the pulling head will be exposed to. These anti-compression members need not transfer the tension in the pulling head, and may therefore be discontinuous components to ease manufacture and assembly. They can be retained in the assembly, where they are not an integrally moulded part of flexible section 40, by the natural (small) radial strain consequential from the normal method of making the braid. As such, they can be of any appropriate length and flexibility. The anisotropic structure as a whole is therefore bendable, and can be covered with polythene to effect a complete waterproof layer. Cap 42 and connector 36 may be connected to flexible section 26 by a crimp as is known in the art to seal the assembly, rendering it water tight.

The skilled man will realise that other materials may be appropriate for construction of the flexible section, depending on the application it is used in and the associated requirements. For example, in some situations the metallic braid may be replaced by a nylon or other braid suitable for transferring a tensile force from the pulling cap to the connector. In other applications, the braid may be replaced by non-braided wires or strands where the torsion characteristics are less important. Furthermore, the braid (or otherwise) may be enclosed in rubber or another suitable waterproofing agent instead of plastic. The anti-compression members may be formed of helical steel or any other appropriate material or structure in order to reduce compression in the flexible section under tension.

An embodiment of the invention has been described above. The skilled man will realise that modifications may be made to the embodiment described without departing from the spirit or scope of the invention. In particular, the cable termination assembly is described in use with an armoured cable having wires for its armour. The invention may be adapted for use with cable having different armour, for example those having braided cables as armour. The invention itself should only be defined by the appended claims.

We claim:

1. A terminated cable comprising an armoured cable having an inner component and an armour layer arranged around the inner component; and a termination assembly, the termination assembly comprising:
    a first clamping member comprising an inner channel having at least a portion tapering to a larger diameter at one end, the cable passing through the inner channel;
    a second clamping member having a central channel and a tapered outer portion lying at least partially within the inner channel of the first clamping member, the tapered outer portion extending to a generally curved portion on one end of the second clamping member, the armour layer being splayed away from the inner component, without passing through the central channel, to pass between along the tapered outer portion and the inner channel, and continuing around the curved portion to bend back on itself, the armour layer being retained between the first clamping member and the second clamping member; and
    an end cap comprising a recessed curved portion which engages the armour layer where it passes around the curved portion of the second clamping member, to clamp the armour layer between the curved portion of the second clamping member and the recessed curved portion of the end cap.

2. A terminated cable according to claim 1, wherein the curved portion of the second clamping member has a shape resembling a torus cut in half in its radial plane.

3. A terminated cable according to claim 2, wherein the tapered outer portion of the second clamping member is generally frusto-conical in shape.

4. A terminated cable according to claim 3, wherein the generally frusto-conical portion of the second clamping member has a convex surface.

5. A terminated cable according to claim 1, wherein the tapered outer portion of the second clamping member is generally frusto-conical in shape.

6. A terminated cable according to claim 5, wherein the generally frusto-conical portion of the second clamping member has a convex surface.

7. A terminated cable according to claim 1, wherein at least one portion of the first clamping member, second clamping member and end cap has grooves thereon for engaging the armour layer.

8. A terminated cable according to claim 1, wherein the first clamping member, second clamping member and the end cap are made from materials with similar thermal expansion coefficients.

9. A kit of parts for making a termination assembly for an armoured cable having an inner component with an armour layer around it, the termination assembly comprising:
    a first clamping member for fitting around the cable, the first clamping member defining a channel through which the cable may pass, at least part of said channel being tapered;
    a second clamping member comprising a channel for receiving the inner component of the cable, a tapered outer section for fitting within said at least part of the tapered portion of the channel in the first clamping member to engage the splayed armour layer of a cable therebetween after passing through said channel in said first clamping member without passing through said channel in said second member, the end face of the second clamping member having a generally curved portion on one end; and an end cap comprising a recessed annular curved section, and a hole through which the inner component of a cable may pass, the end cap being adapted for clamping the armour layer between the curved portion of the second clamping member and the recessed annular curved section of the end cap.

10. A kit of parts according to claim 9, wherein the curved portion of the second clamping member has a shape resembling a torus cut in half in its radial plane.

11. A kit of parts according to claim 10, wherein the tapered outer portion of the second clamping member has a generally frusto-conical shape.

12. A kit of parts according to claim 11, wherein the generally frusto-conical portion of the second clamping member has a convex surface.

13. A kit of parts according to claim 9, wherein the tapered outer portion of the second clamping member has a generally frusto-conical shape.

14. A kit of parts according to claim 13, wherein the generally frusto-conical portion of the second clamping member has a convex surface.

15. A kit of parts according to claim 9, wherein at least one portion of the first clamping member, second clamping member and end cap has grooves thereon for engaging the armour layer.

16. A kit of parts according to claim 9, wherein:
the first clamping member, second clamping member and third clamping member are made from materials with generally similar thermal expansion coefficients.

* * * * *